US009400936B2

(12) United States Patent
Bulan et al.

(10) Patent No.: US 9,400,936 B2
(45) Date of Patent: Jul. 26, 2016

(54) METHODS AND SYSTEMS FOR VEHICLE TAG NUMBER RECOGNITION

(71) Applicant: Xerox Corporation, Norwalk, CT (US)

(72) Inventors: Orhan Bulan, Henrietta, NY (US); Howard Mizes, Pittsford, NY (US); Vladimir Kozitsky, Rochester, NY (US); Aaron M. Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/567,000

(22) Filed: Dec. 11, 2014

(65) Prior Publication Data

US 2016/0171328 A1   Jun. 16, 2016

(51) Int. Cl.
```
G06K 9/00       (2006.01)
G06K 9/20       (2006.01)
G06K 9/32       (2006.01)
G06T 7/00       (2006.01)
```
(52) U.S. Cl.
CPC .............. *G06K 9/325* (2013.01); *G06T 7/0081* (2013.01); *G06K 2209/01* (2013.01); *G06T 2207/10004* (2013.01); *G06T 2207/30252* (2013.01)

(58) Field of Classification Search
CPC .......... G06K 9/00785; G06K 2209/01; G06K 2209/15; G07B 15/06; G07B 15/063; G08G 1/04; G08G 1/0175; H04N 2201/0084
USPC ............................. 382/159, 181, 321, 103–15
See application file for complete search history.

(56) References Cited

U.S. PATENT DOCUMENTS

| | | | |
|---|---|---|---|
| 6,404,902 B1 * | 6/2002 | Takano | G06K 9/209 382/104 |
| 6,473,517 B1 * | 10/2002 | Tyan | G06K 9/344 382/105 |
| 7,302,098 B2 | 11/2007 | Tang et al. | |
| 7,339,495 B2 * | 3/2008 | Kavner | G07B 15/06 340/903 |
| 8,265,988 B2 | 9/2012 | Hedley et al. | |

(Continued)

FOREIGN PATENT DOCUMENTS

EP   2 518 695 A1   10/2012

OTHER PUBLICATIONS

Adaptive Recognition America—Carmen Dot US DOT (USDOT) Number Recognition Software Libary & SDK, printed Oct. 13, 2014, 2 pages, http://adaptiverecognition.com/20130531/p0401.html.

(Continued)

*Primary Examiner* — Kanjibhai Patel
(74) *Attorney, Agent, or Firm* — Kermit D. Lopez; Luis M. Ortiz; Ortiz & Lopez, PLLC

(57) ABSTRACT

Methods and systems for tag recognition in captured images. A candidate region can be localized from regions of interest with respect to a tag and a tag number shown in the regions of interest within a side image of a vehicle. A number of confidence levels can then be calculated with respect to each digit recognized as a result of an optical character recognition operation performed with respect to the tag number. Optimal candidates within the candidate region can be determined for the tag number based on individual character confidence levels among the confidence levels. Optimal candidates from a pool of valid tag numbers can then be validated using prior appearance probabilities and data returned, which is indicative of the most probable tag to be detected to improve image recognition accuracy.

20 Claims, 12 Drawing Sheets

(56) References Cited

U.S. PATENT DOCUMENTS

| | | |
|---|---|---|
| 8,504,415 B2 | 8/2013 | Hedley |
| 8,738,525 B2 | 5/2014 | Balachandran |
| 2009/0018761 A1 | 1/2009 | Petrisor |
| 2009/0171772 A1 | 7/2009 | Petrisor et al. |
| 2011/0194733 A1 | 8/2011 | Wilson |
| 2013/0101171 A1 | 4/2013 | Bulan et al. |
| 2013/0132166 A1 | 5/2013 | Wu et al. |
| 2013/0278767 A1 | 10/2013 | Bernal et al. |

OTHER PUBLICATIONS

Bouchaffra, D. et al., "Recognition of Strings Using Nonstationary Markovian Models: An Application in Zip Code Recognition," IEEE Computer Society Conference on Computer Vision and Pattern Recognition Jun. 23-25, 1999, Fort Collins, CO, pp. 174-179.

Lefkowitz, B. et al., "DOT and CDL Regulation Enforcement Intensified," NLA Government Affairs Director Oct. 2005, 2 pages.

Morrone, F., "USDOT Regulations," NLA Legal Counsel, (2009) 2 pages.

Point Grey, USDOT Recognition System Helps Keep America's Roads Safe, printed Oct. 13, 2014, 3 pages, http://ptgrey.com/news/pressreleases/details.asp?articleID=556.

Zhu, Xi et al., "Face Detection, Pose Estimation, and Landmark Localization in the Wild," Computer Vision and Pattern Recognition (2012), Providence, Rhode Island, Jun. 8 pages.

* cited by examiner

METHODS AND SYSTEMS FOR VEHICLE TAG NUMBER RECOGNITION

TECHNICAL FIELD

Embodiments are generally related to automated vision-based recognition applications. Embodiments are additionally related to transportation services and applications. Embodiments are also related to techniques for improving accuracy in the automated camera-based recognition of vehicle identification numbers.

BACKGROUND OF THE INVENTION

The Federal Motor Carrier Safety Administration (FMCSA) requires that an active and valid U.S. Department of Transportation (USDOT) identification number must be properly displayed on commercial motor vehicles. The USDOT's regulations mandate that companies that operate commercial vehicles transporting passengers or hauling cargo in interstate commerce must be registered with the FMCSA and must have a USDOT number. The information to be displayed on both sides of the vehicle consists of (a) the legal name or a single trade name of the motor carrier operator and (b) the operator's motor carrier identification number preceded by the letters "USDOT". A violation of the vehicle identification requirements can result in a fine of as much as, for example, $11,000.

A number of transportation management companies are interested in automated camera-based recognition of USDOT numbers, wherein a camera is installed on the side of the road and triggered by an in-road sensor to capture an NIR/RGB image of an incoming truck. The captured image is then processed to first localize and then recognize the USDOT number on the side of the vehicle.

Currently, techniques are in operation, which automatically recognize USDOT numbers from vehicle side images captured by an NIR camera. FIG. 1, for example, illustrates a sample prior art image 10 of a side vehicle captured by a camera. The image 10 shown in FIG. 1 is a sample of the image of the side of a truck. The particular image 10 depicted in FIG. 1 not only contains the US DOT number at the bottom of the truck door, but the vehicle identification number in the center and the name of the trucking company above that. Other trucks may contain additional information such as the weight of the truck and the location of the trucking company. A full image of the truck may also contain text in the form of marketing signage, and information that identifies the function of the truck. An algorithm to identify the tag number must be robust against the presence of all this additional information.

FIG. 2 illustrates example prior art USDOT number images 20 having a variety of fonts and image quality. The USDOT number can be written with a variety fonts and sizes on the side of the truck. This variation, in addition to other source of noises, low contrast, and illumination variation poses a challenge on the recognition accuracy. FIG. 2 thus depicts examples of localized USDOT number images with a variety of fonts and sizes. Some of these images are very noisy since captures of the side of the truck are not always performed under optimal conditions. Imaging at night in ongoing traffic might require an NIR camera with low exposure time causing images to be noisy and low contrast. There are also other variations that mitigate the recognition performance such as dark on light or light on dark, embossing, glare, extra characters, blur, etc. All these variations in turn have a negative impact on the recognition accuracy.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved image-processing and image-recognition applications.

It is another aspect of the disclosed embodiments to provide for improved tag number recognition from captured images using prior information.

It is yet another aspect of the disclosed embodiments to provide for an OCR (Optical Character Recognition) based method for USDOT number recognition.

It is still another aspect of the disclosed embodiments to utilize available information, such as a pool of valid USDOT numbers and/or prior appearance probability data obtained from a government website to re-weight OCR recognition confidence for use in USDOT number recognition.

The aforementioned aspects and other objectives and advantages can now be achieved as described herein. Methods and systems for recognizing tag numbers (e.g., USDOT tag numbers) in captured images are disclosed. In an example embodiment, prior information of, for example, valid USDOT numbers in the process of USDOT number recognition can be leveraged to improve recognition accuracy. Such prior information can be in the form of a pool of valid USDOT numbers and their prior appearance probabilities, which can be accessed through, for example, the US Department of Transportation website (i.e., valid USDOT numbers along with the number of vehicles with a given USDOT number are accessible through the website). Note that USDOT numbers are not assigned to vehicles, but rather companies or people so that the same USDOT number can be used by many vehicles that belong to the same company or person.

Example embodiments can include one or more of the following modules and/or operations: 1.) capturing a side view image of a vehicle; 2.) localizing a candidate region for USDOT tag and USDOT tag number in the captured image; 3.) performing OCR on the USDOT tag number and calculating confidence levels for each digit recognized; 4.) determining the N- best candidates for the USDOT tag number based on the individual character confidence levels; and 5.) validating the candidates from a pool of valid USDOT numbers using prior appearance probabilities and returning the most probable USDOT tag that is likely to be detected.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed example embodiments describe a new number recognition and identification approach that leverages prior information of, for example, valid USDOT numbers in the process of USDOT number recognition to improve recognition accuracy. The prior information can be provided in the form of a pool of valid USDOT numbers and their prior appearance probabilities, which can be accessed through, for example, the US Department of Transportation website (i.e., valid USDOT numbers along with the number of vehicles with a given USDOT number are accessible through the website). Note that USDOT numbers are not assigned to vehicles, but rather companies or people so that the same USDOT number can be used by many vehicles that belong to the same company or person.

Figure 3:
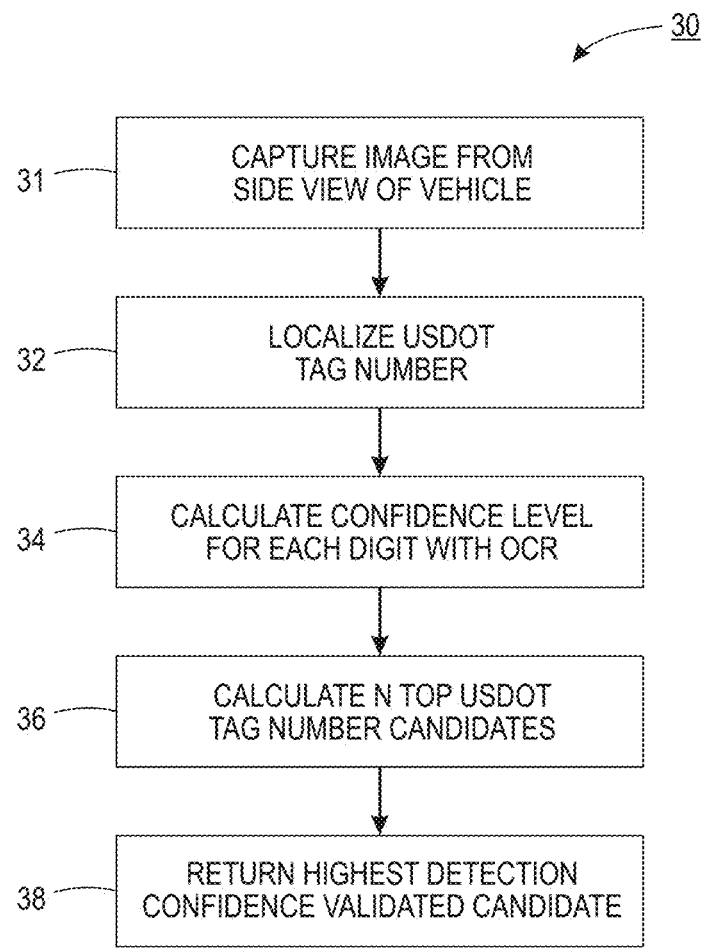
FIG. 3 illustrates a high-level flow chart of operations depicting logical operational steps of a method for number recognition using prior information, in accordance with a preferred embodiment.

FIG. 3 illustrates a high-level flow chart of operations depicting logical operational steps of a method 30 for number recognition using prior information, in accordance with a preferred embodiment. The approach shown in FIG. 3 leverages prior information of valid USDOT numbers in the process of USDOT number recognition to improve recognition accuracy. The prior information can be in the form of a pool of valid USDOT numbers and their prior appearance probabilities, which can be accessed through, for example, the US Department of Transportation website.

Note that although the discussion here refers by way of examples to USDOT numbers and USDOT applications, it can be appreciated that other types of numbering regimes and recognition applications may be implemented in accordance with the general concepts discussed herein. In other words, the disclosed embodiments are not limited to USDOT number recognition, but can apply to many other types of number recognition and identification applications. Additionally, it can be appreciated that the phrase "US DOT" and "USDOT" can be utilized interchangeably to refer to the same characters and that variations may be present in how "US DOT" or "USDOT" are displayed on vehicles.

Figure 1:
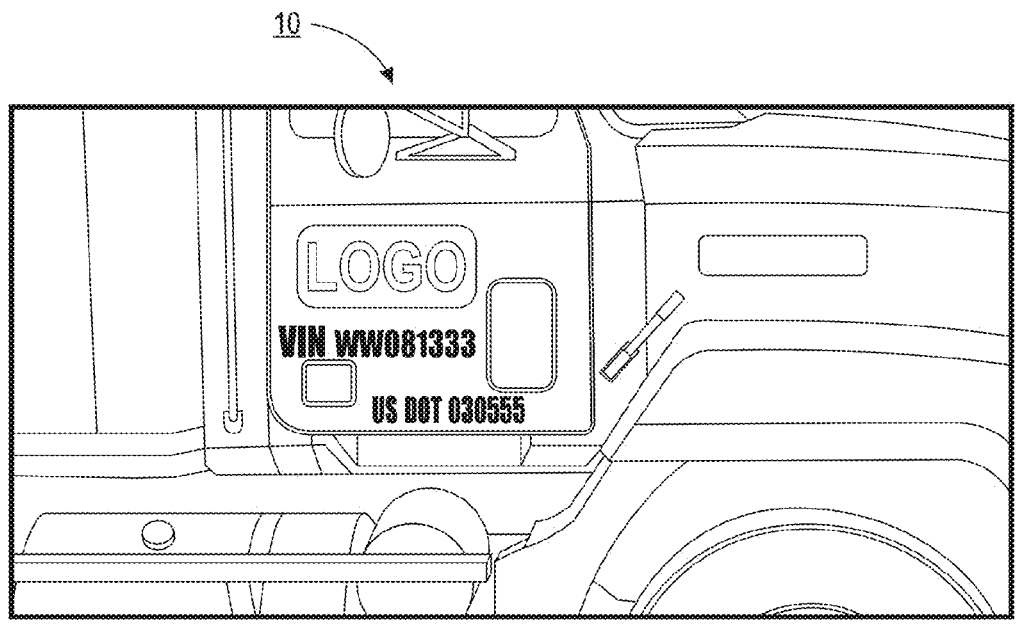
FIG. 1 illustrates an example prior art image of a side vehicle captured by at least one camera.
Figure 2:
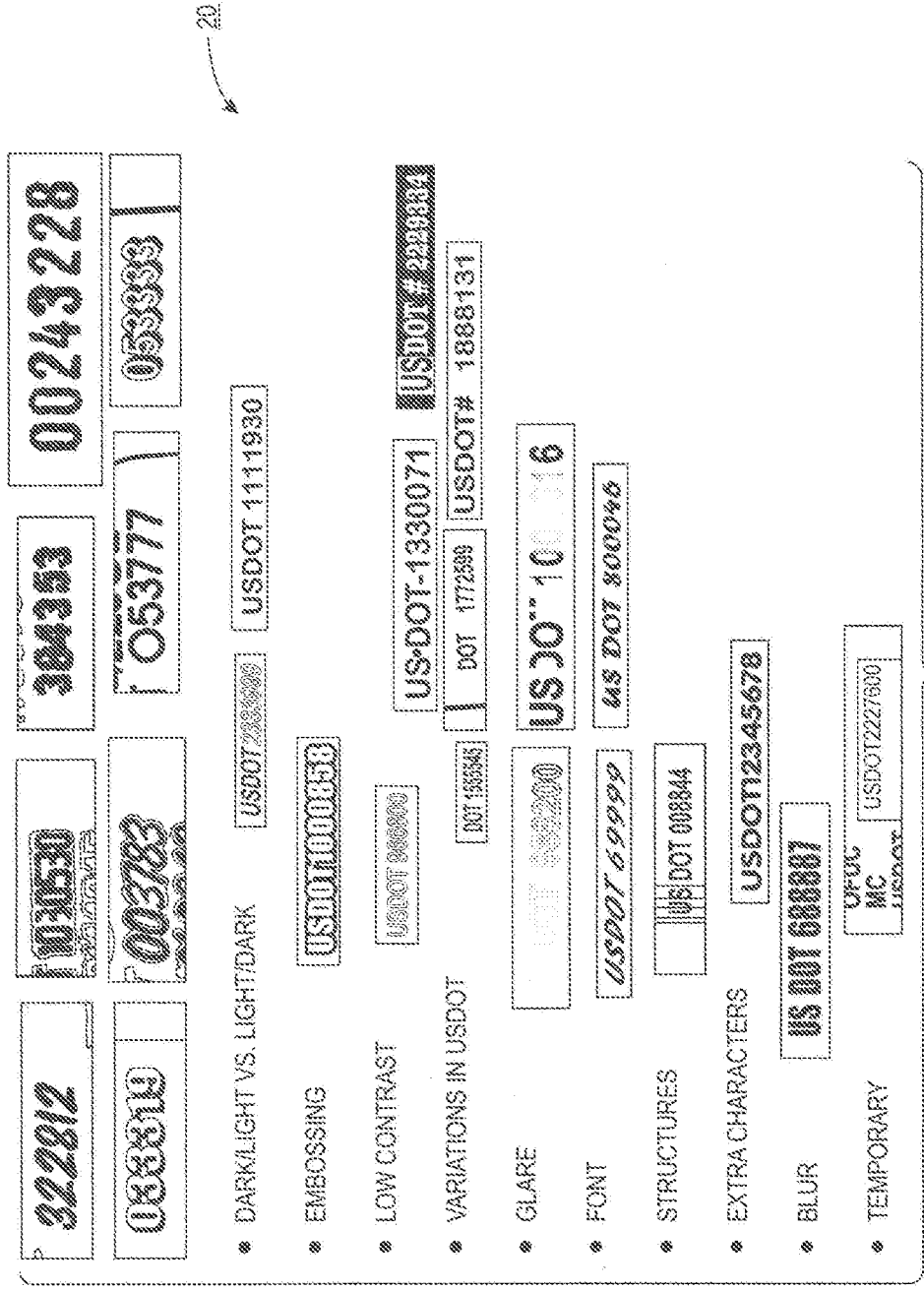
FIG. 2 illustrates example prior art USDOT number images having a variety of fonts and quality.

As indicated at block 31, a step or logical operation can be implemented to capture an image from a side view of a vehicle, such as, for example, the image 10 shown in FIG. 1. Thereafter, as indicated at block 32, a step or logical operation can be implemented to localize a candidate region for USDOT tag and number in the captured image. Then, as shown at block 34, a step or logical operation can be provided for performing OCR in the detected candidate region and calculating confidence levels for each digit recognized.

Next, as illustrated at block 36, a step or logical operation can be provided in which a beam search algorithm is utilized to efficiently identify the top N candidates along with their confidence levels for a USDOT tag number based on the confidence of the individual characters. Note that the term "beam search" or "beam search algorithm" as utilized herein refers to an algorithm that is given a sequence of N nodes, with each node being able to take on a set of m states with a probability $P_{ij}$ of node i taking state j. The beam search algorithm identifies the k highest probabilities candidates for the sequence of nodes without exhaustively searching through all possible combinations of states. Instead, the algorithm keeps a priority queue of the top k states as it explores the nodes from the first node to the last node, pruning sequences that are not in the top k states as each node is explored.

Finally, as indicated at block 38, a step or logical operation can be implemented to determine the detection confidence of each candidate, which is a weighted sum of the confidence of a candidate USDOT tag number and the confidence of the USDOT tag number being detected at a particular imaging station. The candidate with the highest weighted sum is returned as the detected tag.

The operation shown at block 31 involves capturing an image from a side view of a vehicle. The cameras utilized to capture side view image can be installed, for example, on the side of the road at tollbooths, highways, etc. When an incoming vehicle is detected by an in-road sensor or by using other means (e.g., a video camera can also be used to perform the triggering along with recognition), the camera is triggered to capture an image of the side of a vehicle. If the camera is installed in ongoing traffic (e.g., highways), the exposure time may need to be set accordingly to ensure that the blur does not wash out the USDOT number written on the side of the truck. NIR cameras coupled with IR illuminators can be utilized if night vision is desired.

The operation depicted at block 32 involves localizing a candidate region for USDOT tag and number in the captured image. In one embodiment, localization can be implemented such that the problem is broken into two steps. First, image classification can be performed using a series of sliding windows to locate the text "US DOT" in the image of the side of the vehicle. The classifier can be trained offline from a training set that contains a variety of fonts and sizes. A positive sample set that spans this variation can be included in the positive training set. The negative set can be generated using randomly cropped patches that contain the same amount of structure (edges, line thickness) as the positive training set.

In the operational phase, given a vehicle side image, we perform a series of sliding window searches using the classifier trained in the offline phase to locate potential USDOT tags in the image. The detected candidate positive windows are then localized using a non-maximum suppression technique. The locations with the largest scores are candidates for the USDOT tag and are examined in order. The window that best matched the size and aspect ratio of the US DOT is used to transform the image of the tag number for OCR.

Figure 4:
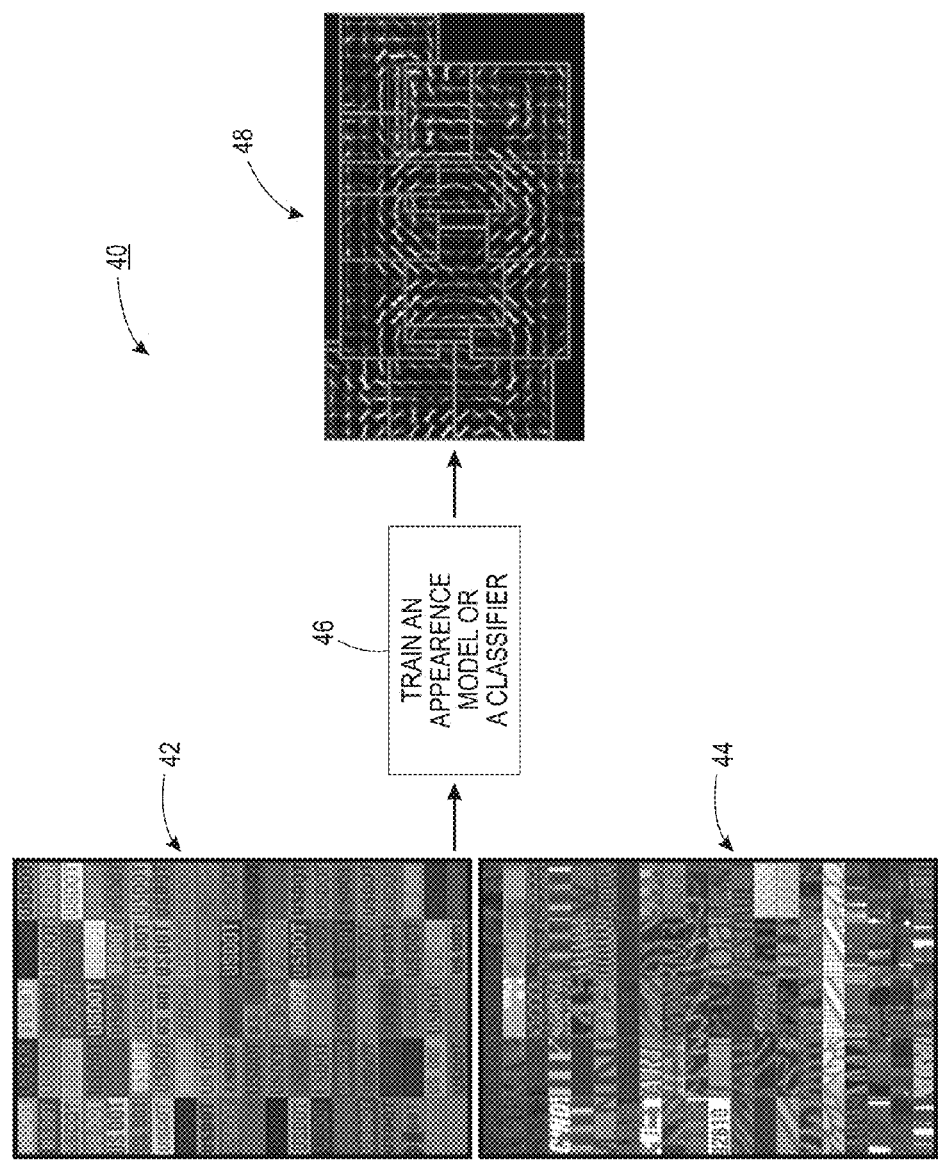
FIG. 4 illustrates a schematic diagram depicting an overview of the offline phase for USDOT tag localization, in accordance with a preferred embodiment.

FIG. 4 illustrates a schematic diagram depicting an overview of the offline phase 40 for USDOT tag localization, in accordance with a preferred embodiment. As shown in FIG. 4, the offline phase 40 includes an operation or module 46 for training an appearance model or a classifier. That is, module 46 may be, for example, a classifier or an appearance model. The classifier or appearance model can be trained using a set of positive samples 42 (i.e., USDOT image patches) and negative samples (i.e., randomly cropped image patches) 44. A set of image features (e.g., SIFT, SURF, HOG, etc.) can be extracted from the training samples and used to train the classifier (e.g., SVM, K-NN, CNN, etc.) and generate an output 48. The trained classifier can then be used in the online phase.

Figure 5:
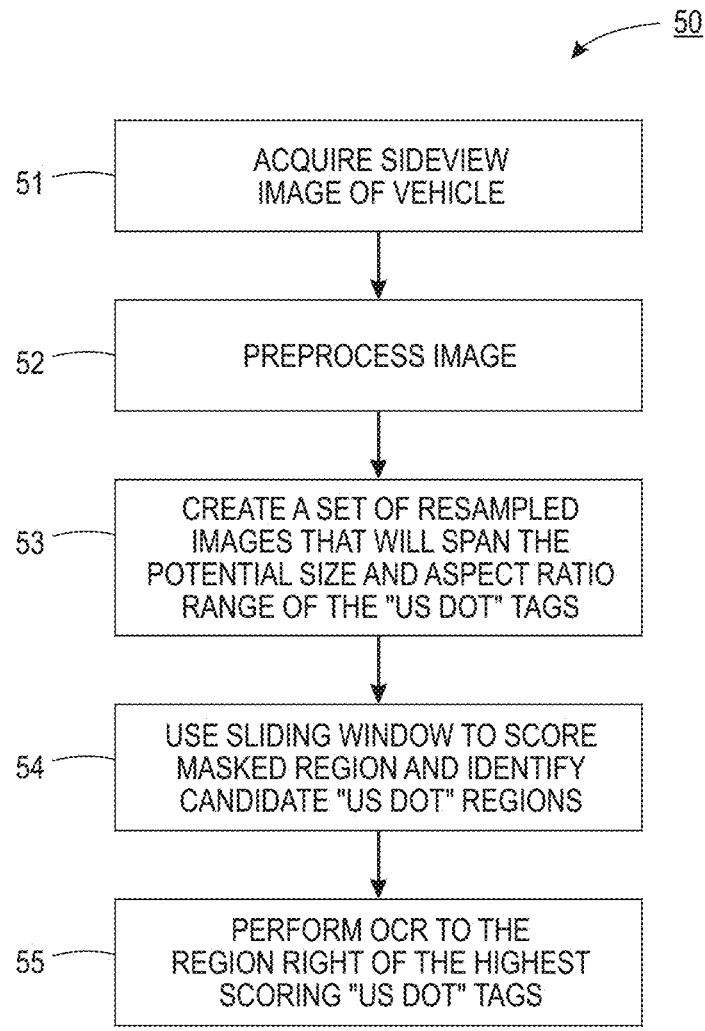
FIG. 5 illustrates a high-level flow chart of operations depicting logical operational steps of a method for locating USDOT tags and numbers, in accordance with an alternative embodiment.

FIG. 5 illustrates a high-level flow chart of operations depicting logical operational steps of a method 50 for locating USDOT tags and numbers, in accordance with an alternative embodiment. FIG. 5 shows the process for identifying the USDOT tag on a truck from a captured image. The process begins as indicated at block 51, wherein a vehicle side-view image having a USDOT number is acquired (i.e., captured by a camera). Then, as shown at block 52, a step or logical operation can be implemented to preprocess the image to identify masked areas that potentially contain text. The preprocessing operation indicated at block 52 can be provided by, for example, a standard low-level algorithm in computer vision. Such algorithms may include median filtering, which removes the salt and pepper noise typical of low contrast images.

The preprocessing operation may also include adaptive histogram equalization. Under some conditions, particularly those taken at night with an NIR camera, may produce an image, which is not uniformly illuminated. Identification of text requires good contrast between the letters and the background, wherever it may occur in the image. Adaptive histogram equalization will create this contrast under these suboptimal conditions.

Another preprocessing operation can involve image binarization, where pixels greater than a given threshold become foreground and the other pixels become the background region. Following that, a series of morphological opening and closing operations can be performed. The structuring elements can be selected such that noise and large uniform regions are eliminated from the foreground, and structure typical of text is combined to become blobs.

In the formation of the dataset, all the "US DOT" tags can be rescaled to the same size. However, in any particular image during the online phase, the size of the "US DOT" tag is unknown. Therefore, a series of re-sampled images can be created, as indicated at block 53. The range over which the re-sampling occurs should cover the range of font sizes and aspect ratios that were observed during the creation of the dataset. The number of magnifications within this range is chosen so that the magnification will vary approximately a factor of 1.3 between two magnifications. This step size has been found to be adequate for facial detection and works effectively in this case.

Thereafter, as shown at block 54, for each re-sampled image, a list of candidate regions containing "US DOT" can be identified. The regions are examined individually using a classical sliding window search approach, where the trained classifier can classify the image in each candidate window. Only regions within the mask identified by the preprocessing operation (block 52) are classified.

A non-maximum suppression technique can then be applied on the positively classified windows to eliminate windows that correspond to the same USDOT tag. Alternatively, the maximum score window can be taken as the location of the USDOT tag before applying non-maximum suppression. The classification models of the previous section can be formulated to assign a probability of a particular area of the image containing the text "US DOT". Typically, most of the image will be classified as not containing "US DOT", but there may be one or more potential candidates.

Some of the re-sampled images may contain zero candidates if the font is scaled to a different size from the USDOT dataset. Once the location of the DOT/USDOT tag is detected, the location, size, and aspect ratio of the USDOT number can be determined with respect to the location, size, and aspect ratio of the detected tag. This processing can be performed as depicted at block 55.

Figure 6:
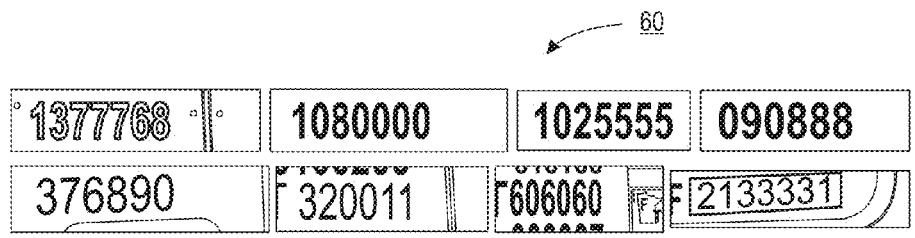
FIG. 6 illustrates sample images of localized USDOT numbers, in accordance with an alternative embodiment.

FIG. 6 illustrates sample images 60 of localized USDOT numbers, in accordance with an alternative embodiment. Recall that the operation of block 34 shown in FIG. 3 involves performing OCR in the detected candidate region and calculating confidence levels for each digit recognized. After localizing the USDOT number in the captured image, the number can be cropped and extracted from the rest of the image. FIG. 6 illustrates a set of USDOT numbers localized and cropped from the captured images. There is a large variety of fonts and sizes of the digits following the US DOT tags on trucks. However, the digits typically have the same size and aspect ratio of the US DOT tag. From the dimensions of the sliding window (discussed earlier) that provide the highest confidence for localization of the US DOT tag, the relative size of the text in the current image and the text in the training data set can be determined. The cropped image can then be resealed to the size of the numbers in the training set. The next step is to recognize the numbers of various fonts and sizes in the cropped patches. In order to perform the recognition task, an OCR engine can be trained specifically for USDOT numbers for recognizing digits. The training data for each digit (i.e., 0 to 9) can be obtained from a set of USDOT images.

Figure 7:
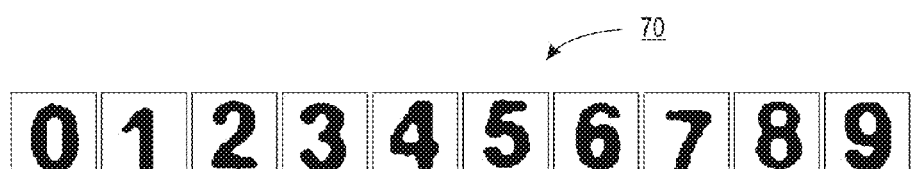
FIG. 7 illustrates example training images for training an OCR engine for binarized images, in accordance with an alternative embodiment.

FIG. 7 illustrates example training images 70 for training an OCR engine for binarized images, in accordance with an alternative embodiment. The OCR classifiers for each digit can be trained in a conventional manner by using the binarized images 70 shown, for example, in FIG. 7. An OCR classifier for a digit can be trained using many examples from various fonts and various noise levels to account for the variations in the captured USDOT images. The classifiers are trained by extracting several image features from the binary digit images using geometric and other attributes such as aspect ratio, eccentricity, etc. FIG. 7 illustrates noise-free training examples with a specific font from 0 to 9. Other fonts can also be utilized coupled with other noise levels.

Figure 8:
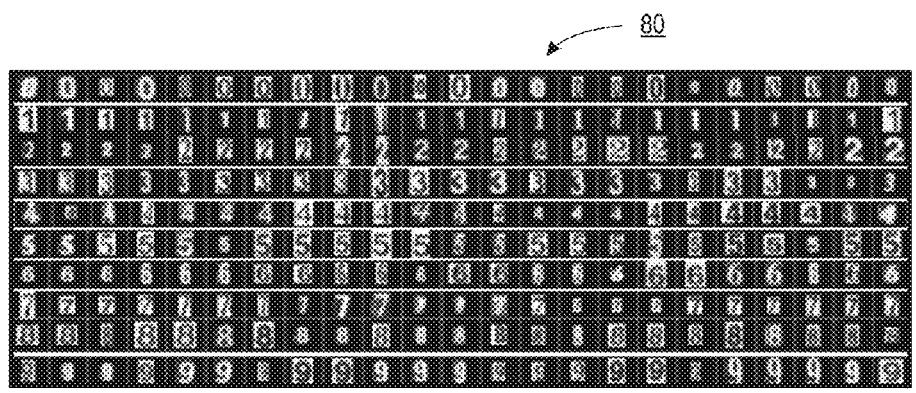
FIG. 8 illustrates example training images for training an OCR engine from grayscale digit images, in accordance with an alternative embodiment.

FIG. 8 illustrates example training images for training an OCR engine from grayscale digit images, in accordance with an alternative embodiment. Alternatively, the OCR classifiers can be trained using the grayscale or color digit images. In this case, image features are extracted from grayscale and color images of the digits. A set of training samples for grayscale digit images are shown in FIG. 8, which can be acquired and cropped from USDOT images. In this case, the OCR classifiers can be trained by extracting a set of features (e.g., SMQT, local binary patterns, etc.) from the grayscale digit images The OCR classifiers, trained either using binary or grayscale images, are then used to recognize the numbers in a given localized USDOT image(s) 60 shown in FIG. 6. If the classifiers are trained using binary images, the localized USDOT image first needs to be binarized. The binarization can be performed using one of the known techniques in the literature (e.g., Otsu's thresholding algorithm, gradient based binarization, etc.). After the binarization, the connected components can be calculated in the image, which can be scrutinized based on the aspect ratio, size, and other geometric attributes to obtain only the components for the digits and eliminate others due to noise or other structures in the image. Each connected component can then be analyzed by the OCR classifiers to recognize the digits.

If OCR classifiers are trained using the grayscale digit images, a sliding window search may be required in the localized USDOT image to recognize the digits. The sliding window search is performed similarly as described earlier. An OCR engine, based on binary images, is preferable since sliding window search typically takes more computational time compared to analyzing the connected components. The binarization process can be prone to errors if the captured images are noisy which impacts the recognition accuracy. In some situations involving noisy images, performing an OCR operation using the sliding window approach described earlier may be more advantageous as accurate binarization of noisy and low contrast images is challenging.

Figure 9:
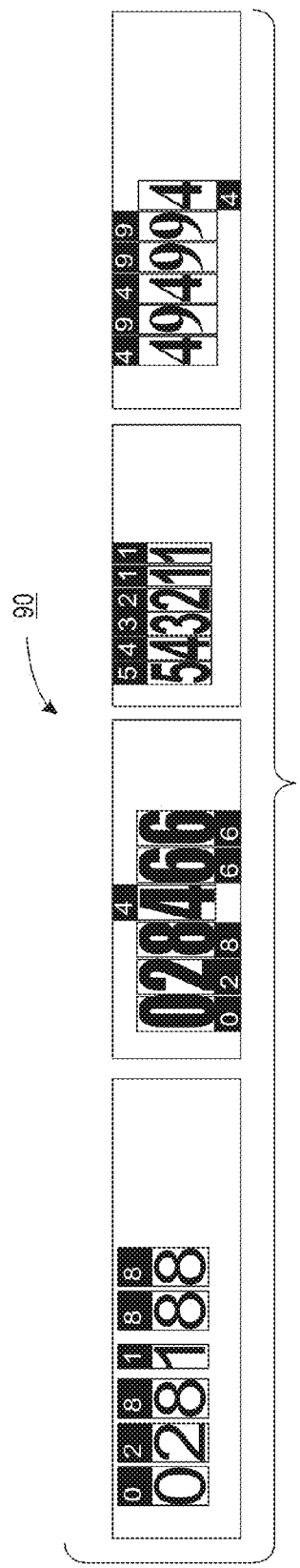
FIG. 9 illustrates images depicting recognized digits by an OCR engine, in accordance with an alternative embodiment.

FIG. 9 illustrates images 90 depicting recognized digits by an OCR engine, in accordance with an alternative embodiment. The OCR engine outputs not only recognized digits, but also character confidence levels for each digit. These confidence levels are calculated based on the score of the classifiers trained for the digits. For each digit, the confidence levels being from 0 to 9 can be calculated using the OCR classifiers.

One of the key aspects of the disclosed embodiments involves calculating confidence levels for each candidate number returned by the OCR and sequencing them based on their confidence levels. A typical OCR engine will return a single conclusion and confidence given an input image of a digit. Some OCR engines provide additional information in the form of runner-up candidates and confidences giving the user an idea for a subset of potential labels. Since DOT images are captured in un-controlled lighting conditions, it is likely that an image of an actual '0' may include dirt in the middle such that '8' would not be an unusual conclusion or vice versa. The same would hold true for a '3' with dirt on the left, thereby making it look like or seem to be a possible '8'. The problem can be further amplified by the wide variety of fonts that are seen in the wild.

After the OCR engine calculates the confidence levels for each digit, the confidence levels of the US DOT tag number can be calculated using the digit confidence levels. The likelihood of each number is the product of the probability of each digit as determined by the classifier.

Figure 10:
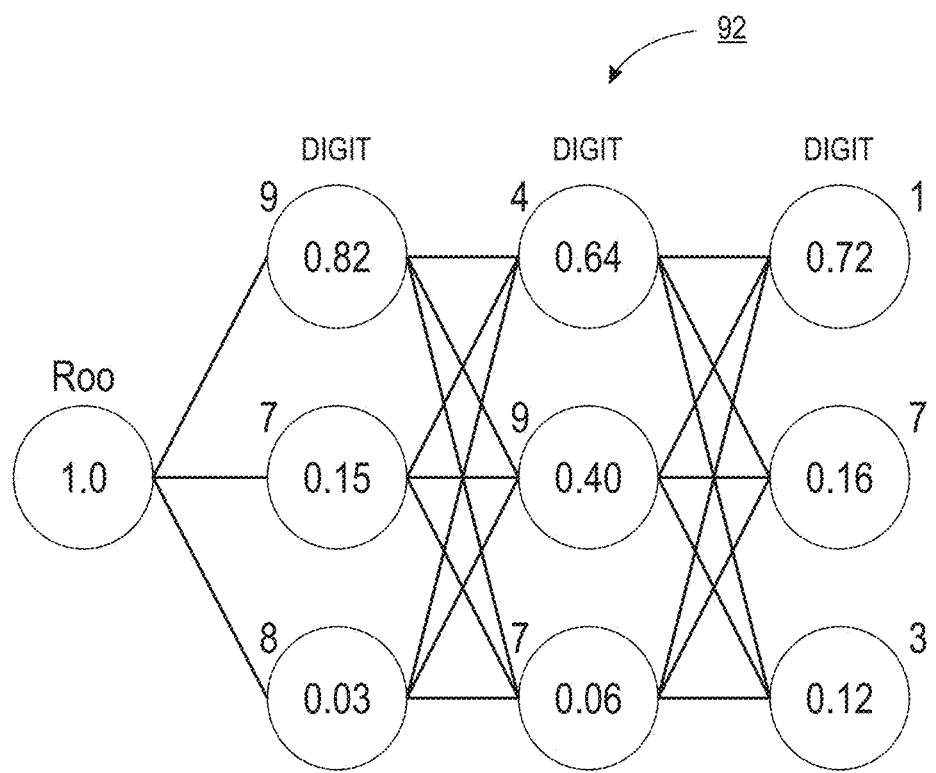
FIG. 10 illustrates a schematic diagram of a simple trellis depicting how paths through the trellis provide the probability for a sequence of digits being any particular USDOT tag, in accordance with an alternative embodiment.

For a typical 6 digit US DOT tag number, there are $10^6$ candidates, although most of these candidates have a low probability. Exhaustively finding the highest probability candidates is inefficient. Identifying the highest probability candidates can be determined more efficiently by using, for example, a beam search algorithm. FIG. 10 thus represents the results of a beam search algorithm for a USDOT tag number application for a simple example in which only 3 candidate numbers are returned from a 3 digit tag. Each node of the graph is the probability of a particular character existing in that position. A USDOT candidate tag number is a path through the graph, and is probability of occurrence is a product of the probabilities of each individual character.

FIG. 10 illustrates a schematic diagram of a simple trellis 92 depicting how paths through the trellis provide the probability for a sequence of digits being any particular USDOT tag, in accordance with an alternative embodiment. In FIG. 10, the three highest probability digits in each place are shown. The highest confidence USDOT tag number is 941, which is predicted to occur with a probability of 0.82×0.64× 0.72=0.377856. All other digit sequences are less likely than this probability.

In a beam search algorithm, for example, the root node can be expanded and the paths to the first digit placed into a set of likely candidates. In this example, let us limit the number of candidates to three, although this size can be arbitrarily chosen in the real USDOT application. After the first expansion the candidate set contains {9(0.82), 7(0.15), 8(0.03)}, where the number outside of the parentheses is the expansion so far and the number inside the parentheses is the probability. When the 9 nodes of digit one are expanded, the sequences 94 and 99 displace the sequence 8, and the candidate set now contains {94(0.5248), 99(0.3280), and 7(0.15)}. The sequence 7 is then expanded with only 74 remaining in the set and the likely candidate set becomes {94(0.5248), 99(0.3280), and 74(0.0960)}. The final expansion is {941 (0.377856), 991(0.236160), and 947(0.083968)}. This final set is then passed to the next state of the algorithm and examined in descending order of confidence. A priority queue data structure is an efficient way to implement the algorithm.

Figure 11:
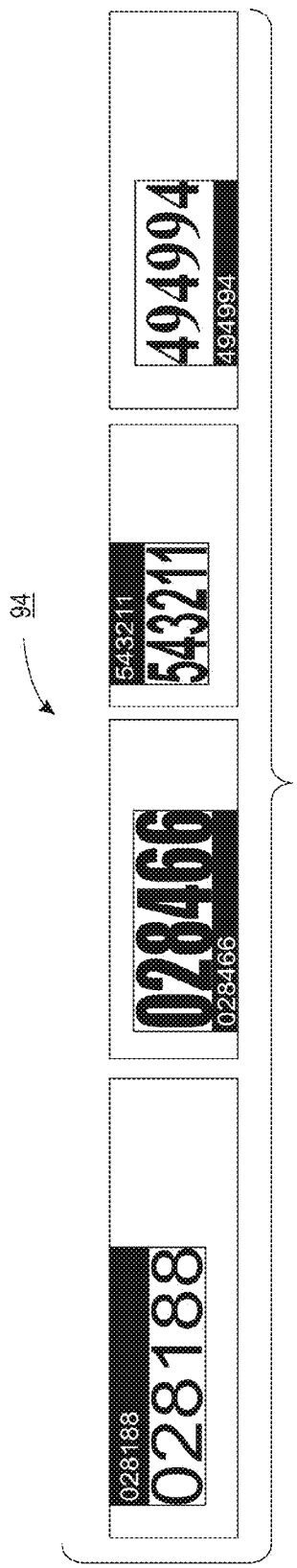
FIG. 11 illustrates example images depicting the highest confidence USDOT numbers recognized after calculating word confidence levels, in accordance with an alternative embodiment.
Figure 14:
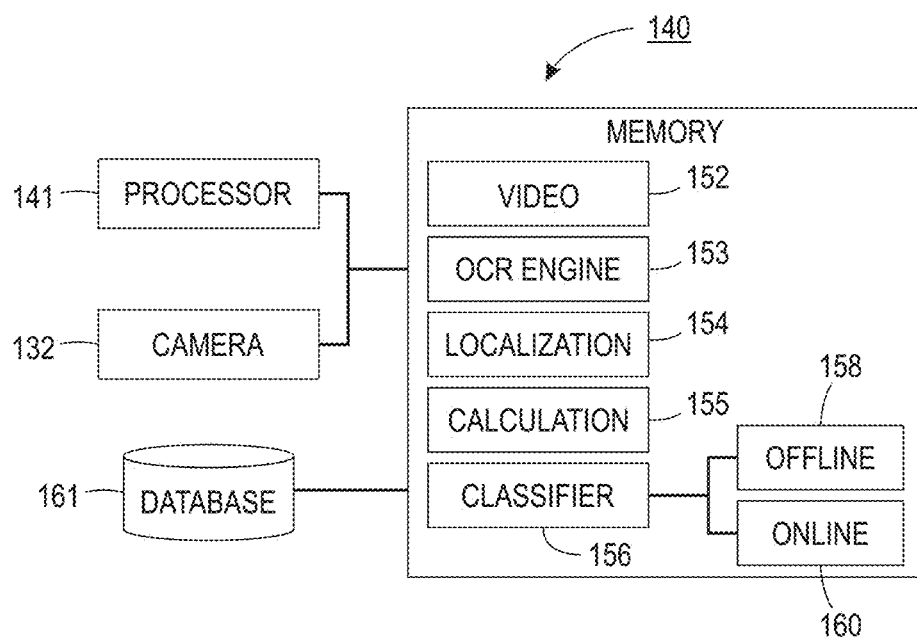
FIG. 14 illustrates a block diagram of an example system for USDOT number recognition using prior information, in accordance with an alternative embodiment.

FIG. 11 illustrates example images 94 depicting the highest confidence USDOT numbers recognized after calculating word confidence levels, in accordance with an alternative embodiment. US DOT tags can be up to 7 digits long so there are 10,000,000 possible candidates. Only a subset of these candidates has been assigned by the department of transportation and would return a hit upon a query of the US DOT database. However, there is still a significant probability that a misclassified digit would return a hit from the US DOT database. An example of such a database is shown in FIG. 14 as database 161.

Therefore, an additional database (e.g., database 161 of FIG. 14) can optionally be constructed, which taken together with the US DOT database, provides a mechanism to confirm that the US DOT tag number is successfully identified. Typically, specific US DOT detection sites are frequented by the same truck or trucks from the same company as they travel common routes. An additional database (e.g., database 161 of FIG. 14) can also be constructed, which contains the US DOT number of trucks that have been identified by the detector, the location of the detector, and the relative number of times they have been detected. A weighted sum of the probability of detecting a particular US DOT number from past detections and a given detection site is added to the probability of valid candidates. By using this approach, slightly lower confidence candidates that have been seen often will be preferred over a high confidence candidate that has never been seen at any particular detection station.

In an alternative example embodiment, spatiotemporal information can also be included in this probability calculation. More specifically, a vehicle traveling along a particular highway route can only appear at a subset of locations at some short time (hours) in the future. As such, the associated US DOT number associated with this vehicle should be somewhat more probable at these "downstream" locations. In this way, a radius of likely or possible locations surrounding a prior recognition can be used to affect the probability comparisons at future recognition stations. By using this approach, slightly lower confidence candidates that have been seen at nearby detection centers within some given time window will be preferred over a high confidence candidates that has never been seen at nearby detection stations within some time window.

Figure 12:
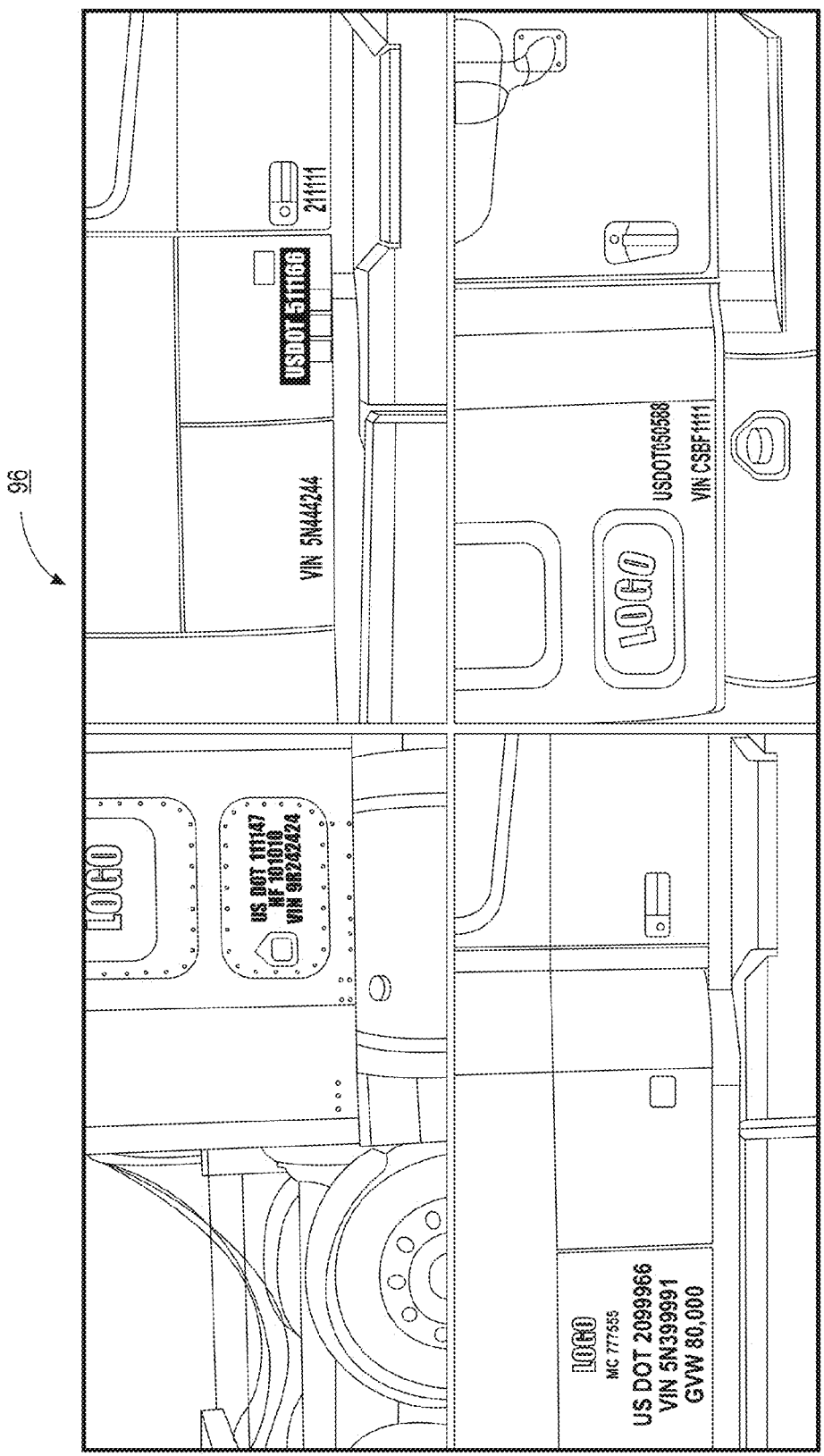
FIG. 12 illustrates example images depicting sample images from a test database, in accordance with an alternative embodiment.

FIG. 12 illustrates example images 96 from a test database, in accordance with an alternative embodiment. Note that the present inventors have conducted experiments on a database of USDOT images acquired from a real-world application setting. In one example set, 2,556 USDOT images were captured during both day-time and night time. The resolution of the captured images was 2448×1248 and the size of the height of the USDOT tag/number varied between 20 to 100 pixels. FIG. 12 thus shows four sample USDOT images 96 in such a database of images captured during daytime and nighttime, wherein the size, font, and contrast of the USDOT tags vary.

The USDOT numbers were localized and cropped. An OCR operation was then performed with respect to the cropped image patches. A publicly available Tesseract OCR engine was employed for recognition and calculating character confidence levels. The performance with and without was evaluated using the prior information-USDOT database. When the USDOT database was used in the recognition process, the accuracy increased from 82% to 94%.

Figure 13:
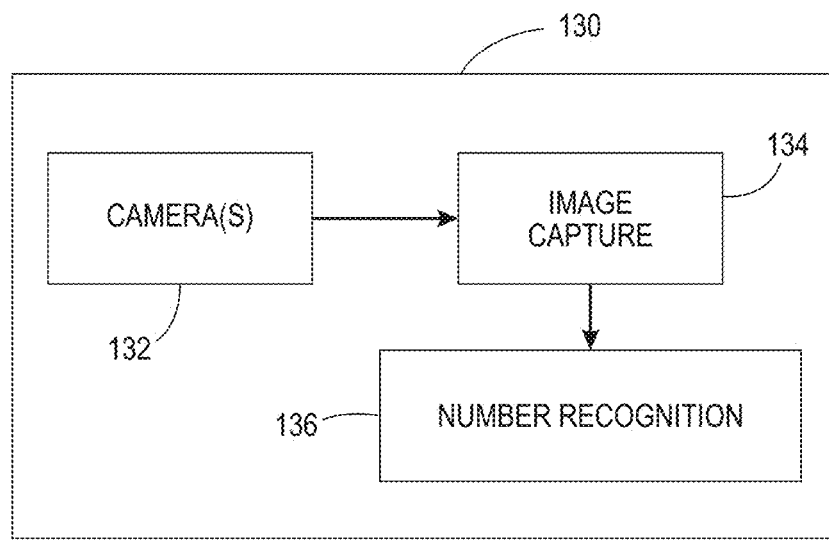
FIG. 13 illustrates a block diagram of an example system for USDOT number recognition using prior information, in accordance with an alternative embodiment.

FIG. 13 illustrates a block diagram of an example system 130 for USDOT number recognition including a number recognition module 136, in accordance with an alternative embodiment. The system 130 shown in FIG. 13 can include one or more cameras such as camera 132, which can capture an image (e.g., side view) of a vehicle as shown at block 134. The image is then subject to the number recognition module 136, which can perform, for example, one or more of the operations shown at blocks 31, 32, 34, 36, and 38 of FIG. 3.

FIG. 14 illustrates a block diagram of an example system 140 for USDOT number recognition using prior information, in accordance with an alternative embodiment. Note that in FIGS. 13-14, identical or similar parts or elements are indicated by identical reference numerals. Thus, the camera 132 and the processor 141 can communicate with, for example, a memory, which stores, for example, video data 152 (e.g., video images of a truck captured by camera 132), along with an OCR engine 153, a localization module 154, a calculation module 155, a classifier module 156, and modules 158 and 160 for respectively performing offline and/or online training phases, as discussed herein. The localization module 154 can perform, for example, the localization operations discussed earlier herein such as, for example, localization operations depicted at block 32 of FIG. 3. The calculation module 155 can be provided to, for example, calculate the confidence for each digit with OCR, calculate the N top USDOT tag number candidates, and return the highest detection confidence validated candidate as respectively shown at blocks 34, 36, and 38 in FIG. 3.

As can be appreciated by one skilled in the art, embodiments can be implemented in the context of a method, data processing system, or computer program product. Accordingly, embodiments may take the form of an entire hardware embodiment, an entire software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 15:
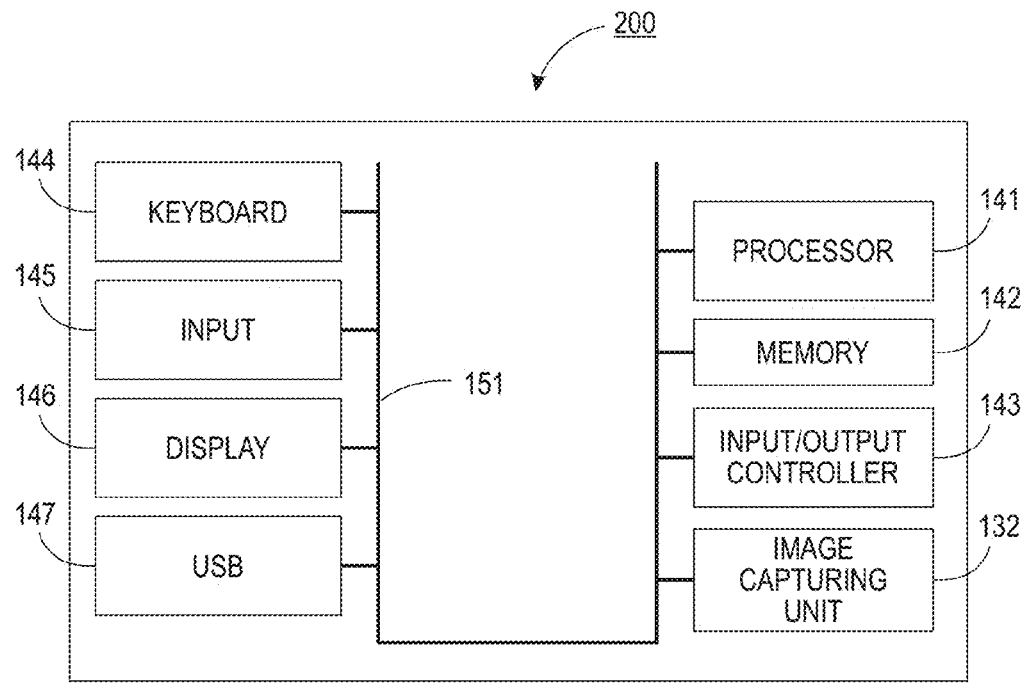
FIG. 15 illustrates a schematic view of a computer system, in accordance will embodiment.
Figure 16:
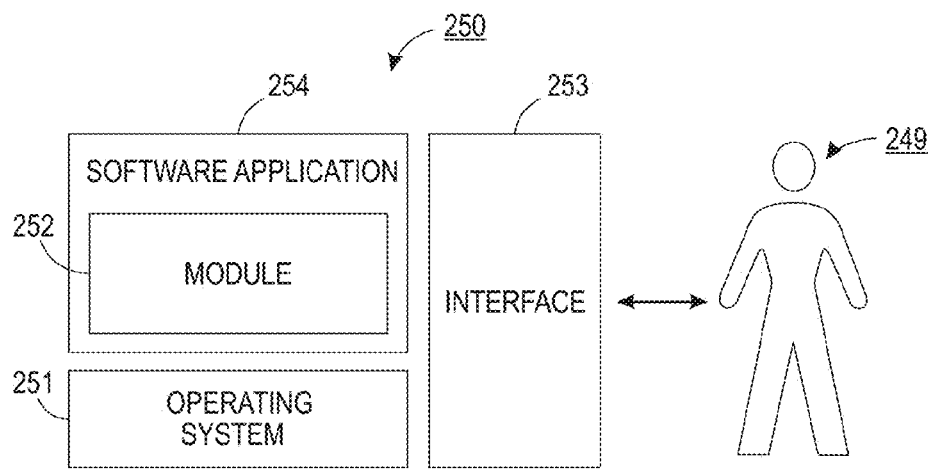
FIG. 16 illustrates a schematic view of a software system including a module, an operating system, and a user interface, in accordance with an embodiment.

FIGS. 15-16 are provided as exemplary diagrams of data-processing environments in which embodiments of the present invention may be implemented. It should be appreciated that FIGS. 15-16 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 15, some embodiments may be implemented in the context of a data-processing system 200 that can include, for example, a processor 141, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. Note that the memory 142 shown in FIG. 15 is analogous or similar to the memory depicted in FIG. 14.

FIG. 16 illustrates a computer software system 250 for directing the operation of the data-processing system 200 depicted in FIG. 15. Software application 254, stored for example, in memory 142, generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user may supply additional inputs or terminate a session. The software application 254 can include a module 252 that can, for example, implement instructions or operations such as those shown in FIGS. 3, 4, and 5 herein. In some instances, module 254 may be equivalent to, for example, the module 136 depicted in FIG. 13.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 15-16 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein. In one embodiment, for example, a method for tag recognition in captured images is disclosed. Such a method can include the steps or logical operations of, for example: localizing a candidate region from regions of interest with respect to a tag and a tag number shown in regions of interest within a side image of a vehicle; calculating a plurality of confidence levels with respect to each digit recognized as a result of an optical character recognition operation performed with respect to the tag number; determining optimal candidates within the candidate region for the tag number based on individual character confidence levels among the plurality of confidence levels; and validating the optimal candidates from a pool of valid tag numbers using prior appearance probabilities and returning data indicative of a most probable tag to be detected to improve image recognition accuracy.

In another embodiment, a step or logical operation can be provided for initially capturing the side image of the vehicle from at least one camera to identify the regions of interest within the side image of the vehicle. In yet another embodiment, a step or logical operation can be provided for performing the optical character recognition operation with respect to the tag number. In still another embodiment, a step or logical operation can be provided for localizing the candidate region from the regions of interest further comprises classifying the side image using a classifier trained as a trained classifier in an offline phase.

In some embodiments, a step or logical operation can be provided for training the classifier in the offline phase using a training set comprising positive samples and negative samples. In yet other embodiments, the trained classifier can be used in an online phase.

In other embodiments, the step or logical operation for validating the optimal candidates from the pool of valid tag numbers can further include a step or logical operation for retrieving the pool of valid tag numbers from a database of tags. In some embodiments, the aforementioned database can include data indicative of the location of a test site and a time of tag detection. In some embodiments, the prior probability of detection at a given location can increase based on the number of prior detections at the given location. In yet another embodiment, the prior probability of detection at a given location increases based on the existence of a detection of the same tag at a nearby facility within a time window determined by a travel time between the present facility and the nearby facility.

In another embodiment, a system for tag recognition in captured images can be implemented. Such a system can include one or more cameras (e.g., video surveillance camera), one or more processors that communicate with the camera(s), and a computer-usable medium embodying computer program code, the computer-usable medium capable of communicating with the processor(s). The computer program code can include instructions executable by the processor(s)

and configured, for example, for: localizing a candidate region from regions of interest with respect to a tag and a tag number shown in regions of interest within a side image of a vehicle captured by the camera(s); calculating a plurality of confidence levels with respect to each digit recognized as a result of an optical character recognition operation performed with respect to the tag number; determining optimal candidates within the candidate region for the tag number based on individual character confidence levels among the plurality of confidence levels; and validating the optimal candidates from a pool of valid tag numbers using prior appearance probabilities and returning data indicative of a most probable tag to be detected to improve image recognition accuracy.

In some embodiments, the instructions can be further configured for initially capturing the side image of the vehicle from the camera(s) to identify the regions of interest within the side image of the vehicle. In another embodiment, an OCR engine can be implemented for performing the optical character recognition operation with respect to the tag number. In yet other embodiments, the instructions can be further configured for classifying the side image using a classifier trained in an offline phase. In other embodiments, the instructions can further include instructions for retrieving the pool of yard Lag numbers from a database of tags.

In still other embodiments, a processor-readable medium storing code representing instructions to cause a process for tag recognition in captured images can be implemented. Such code can include code to, for example: localize a candidate region from regions of interest with respect to a tag and a tag number shown in regions of interest within a side image of a vehicle; calculate a plurality of confidence levels with respect to each digit recognized as a result of an optical character recognition operation performed with respect to the tag number; determine optimal candidates within the candidate region for the tag number based on individual character confidence levels among the plurality of confidence levels; and validate the optimal candidates from a pool of valid tag numbers using prior appearance probabilities and returning data indicative of a most probable tag to be detected to improve image recognition accuracy.

It will be appreciated that variations of the above-disclosed and other features and functions, or alternatives thereof, may be desirably combined into many other different systems or applications. It will also be appreciated that various presently unforeseen or unanticipated alternatives modifications, variations or improvements therein may be subsequently made by those skilled in the art, which are also intended to be encompassed by the following claims.

What is claimed is:

1. An image-processing method for tag recognition in captured images, said method comprising:
    capturing a side image of a vehicle utilizing at least one camera of an automated vision-based recognition system comprising an image processor;
    localizing with said image processor a candidate region from regions of interest with respect to a physical object comprising a tag and a tag number shown in regions of interest within said side image of said vehicle by classifying said side image using a classifier trained as a trained classifier in an offline phase;
    calculating with said image processor a plurality of confidence levels with respect to each digit recognized as a result of an optical character recognition operation performed with respect to said tag number;
    determining with said image processor optimal candidates within said candidate region for said tag number based on individual character confidence levels among said plurality of confidence levels; and
    validating with said image processor said optimal candidates from a pool of valid tag numbers using prior appearance probabilities and returning data indicative of a most probable tag to be detected to improve image recognition accuracy with respect to data representing said physical object comprising said tag and tag number.

2. The method of claim 1 wherein said at least one camera comprises an NIR camera coupled with at least one IR illuminator for night vision capturing of said side image of said vehicle.

3. The method of claim 2 further comprising performing said optical character recognition operation with respect to said tag number.

4. The method of claim 3 further comprising training said classifier in said offline phase using a training set containing a variety of fonts and sizes, said training set comprising a positive sample set that spans said variety of fonts and sizes and a negative sample set that is generated utilizing randomly cropped patches that contain a same amount of structure as said positive sample set.

5. The method of claim 4 further comprising using said trained classifier in an online phase.

6. The method of claim 5 wherein said validating said optimal candidates from said pool of valid tag numbers, further comprises retrieving said pool of valid tag numbers from a database of tags.

7. The method of claim 6 wherein said database further comprises data comprising location of a test site and a time of tag detection.

8. The method of claim 6 wherein a prior probability of detection at a given location increases based on a number of prior detections at said given location.

9. The method of claim 6 wherein a prior probability of detection at a given location increases based on an existence of a detection of a same tag at a nearby facility within a time window determined by a travel time between a present facility and said nearby facility.

10. An image-processing system for tag recognition in captured images, said system comprising:
    at least one camera of an automated vision-based recognition system;
    a processor that communicates with said at least one camera; and
    a computer-usable medium embodying computer program code, said computer-usable medium capable of communicating with the processor, said computer program code comprising instructions executable by said processor and configured for:
        capturing a side image of a vehicle utilizing at least one camera of an automated vision-based recognition system;
        localizing a candidate region from regions of interest with respect to a physical object comprising a tag and a tag number shown in regions of interest within said side image of said vehicle captured by said at least one camera by classifying said side image using a classifier trained as a trained classifier in an offline phase;
        calculating a plurality of confidence levels with respect to each digit recognized as a result of an optical character recognition operation performed with respect to said tag number;
        determining optimal candidates within said candidate region for said tag number based on individual character confidence levels among said plurality of confidence levels; and validating said optimal candidates from a pool of valid tag numbers using prior appearance probabilities and returning data indicative of a most probable tag to be detected to improve image recognition accuracy with respect to data representing said physical object comprising said tag and tag number.

11. The system of claim 9 wherein said at least one camera comprises an NIR camera coupled with at least one IR illuminator for night vision capturing of said side image of said vehicle.

12. The system of claim 11 further comprising an OCR engine for performing said optical character recognition operation with respect to said tag number.

13. The system of claim 10 wherein said instructions are further configured for training said classifier in said offline phase using a training set containing a variety of fonts and sizes, said training set comprising a positive sample set that spans said variety of fonts and sizes and a negative sample set that is generated utilizing randomly cropped patches that contain a same amount of structure as said positive sample set.

14. The system of claim 13 wherein said instructions are further configured for retrieving said pool of valid tag numbers from a database of tags and wherein said database of tags further comprises data comprising a location of a test site and a time of tag detection.

15. The system of claim 14 wherein a prior probability of detection at a given location increases based on a number of prior detections at said given location.

16. The system of claim 14 wherein a prior probability of detection at a given location increases based on an existence of a detection of a same tag at a nearby facility within a time window determined by a distance between a present facility and said nearby facility.

17. A non-transitory processor-readable medium storing code representing instructions to cause a process for tag recognition in captured images, said code comprising code to:
    capture a side image of a vehicle utilizing at least one camera of an automated vision-based recognition system comprising an image processor;
    localize a candidate region from regions of interest with respect to a physical object comprising a tag and a tag number shown in regions of interest within said side image of said vehicle by classifying said side image using a classifier trained as a trained classifier in an offline phase;
    calculate a plurality of confidence levels with respect to each digit recognized as a result of an optical character recognition operation performed with respect to said tag number;
    determine optimal candidates within said candidate region for said tag number based on individual character confidence levels among said plurality of confidence levels; and
    validate said optimal candidates from a pool of valid tag numbers using prior appearance probabilities and returning data indicative of a most probable tag to be detected to improve image recognition accuracy with respect to data representing said physical object comprising said tag and tag number.

18. The non-transitory processor-readable medium of claim 17 wherein said code further comprises code to train said classifier in said offline phase using a training set containing a variety of fonts and sizes, said training set comprising a positive sample set that spans said variety of fonts and sizes and a negative sample set that is generated utilizing randomly cropped patches that contain a same amount of structure as said positive sample set.

19. The non-transitory processor-readable medium of claim 18 wherein said code further comprises code to use said trained classifier in an online phase.

20. The non-transitory processor-readable medium of claim 18 wherein said code further comprises code to:
    perform said optical character recognition operation with respect to said tag number and wherein said at least one camera comprises an NIR camera coupled with at least one IR illuminator for night vision capturing of said side image of said vehicle.

\* \* \* \* \*